(12) United States Patent
Wang et al.

(10) Patent No.: US 8,091,098 B2
(45) Date of Patent: Jan. 3, 2012

(54) SLOT-IN DISK DRIVE

(75) Inventors: Ta-Hsiang Wang, Hsinchu (TW);
Chien-Wei Huang, Hsinchu (TW);
Yung-Han Wu, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 720 days.

(21) Appl. No.: 12/099,872

(22) Filed: Apr. 9, 2008

(65) Prior Publication Data

US 2009/0125923 A1 May 14, 2009

(30) Foreign Application Priority Data

Nov. 8, 2007 (CN) .......................... 2007 1 0169283

(51) Int. Cl.
*G11B 17/03* (2006.01)
*G11B 17/04* (2006.01)
*G11B 33/02* (2006.01)

(52) U.S. Cl. ........................................ 720/609; 720/637
(58) Field of Classification Search .................. 720/607, 720/609, 636–638
See application file for complete search history.

(56) References Cited

U.S. PATENT DOCUMENTS

| 6,208,606 | B1* | 3/2001 | Saito | 720/609 |
| 6,654,334 | B1* | 11/2003 | Yamashita et al. | 720/641 |
| 7,784,068 | B2* | 8/2010 | Fujisawa | 720/636 |
| 2004/0205786 | A1* | 10/2004 | Kagawa | 720/607 |
| 2004/0223420 | A1* | 11/2004 | Yokota | 369/30.36 |
| 2007/0186219 | A1* | 8/2007 | Wang et al. | 720/607 |

* cited by examiner

*Primary Examiner* — Daniell L Negron
*Assistant Examiner* — Adam B Dravininkas
(74) *Attorney, Agent, or Firm* — Thomas, Kayden, Horstemeyer & Risley, LLP

(57) ABSTRACT

A disk drive includes an insert-and-eject device and a disk guide unit. The insert-and-eject device is used for inserting and ejecting a disk. The disk guide unit includes a rack and a slide member connected to the insert-and-eject device in such a manner that reciprocal movement of the disk guide unit along a first direction permits the slide member to drive the insert-and-eject device to insert and eject the optical disk from the disk drive. An emergency release device is mounted on the slide member, and includes a horizontal element movable along a second direction. The rack is formed with a retention groove such that the movement of the horizontal element along the second direction permits a the horizontal element to extend within or exit the retention groove so as to couple the slide member with the rack or to disengage the slide member from the rack.

9 Claims, 6 Drawing Sheets

1

SLOT-IN DISK DRIVE

FIELD OF THE INVENTION

The invention relates to a slot-in type disk drive, more particularly to a slot-in type disk drive having an emergency release device for releasing an optical disk from a disk compartment in case the circumstance demands.

BACKGROUND OF THE INVENTION

A motor is implemented in a conventional disk drive to control and activate a gear set in order to draw an optical disk into or eject the same from a disk compartment. However, the motor cannot be activated in case the disk drive is out of order or when no electrical power is available, thereby preventing the normal ejection of the disk from the disk compartment. Under such a situation, the disk must be removed manually, such as using hands or tool. One will find that the disk is jammed within the disk compartment due to the torque generated by meshing of the gear set with respect to the motor. A special emergency release device is required in order to remove the disk manually from the disk compartment.

U.S. Patent Publication No. 2004/0223420 discloses a disk apparatus including an emergency release device for manually release the disk from the disk compartment. The preceding disk apparatus 1 (see FIG. 2 of the citation) includes a loading motor 21 connected operably to the emergency release device. The emergency release device is further coupled to the disk insert-and-eject device, wherein the insert-and-eject device includes an ejecting lever 17 and a guide lever 18. The emergency release device includes a loading gear unit G1 (see FIG. 4) and a rack gear unit G2 meshed with the loading gear unit G1. The rack gear unit G2 has one end connected to the insert-and-eject device such that activation of the loading motor 21 results in driving of the loading gear unit G1, which, in turn, moves the rack gear unit G2 within the disk compartment, thereby drawing in or ejecting the disk from the disk compartment.

In case the preceding disk drive is out of order or when no power source is available, the loading motor 21, the rack gear unit G2 and the loading gear unit G1 will be disposed at a dead-lock state due to meshing relationships among them. At this time, the user must insert the emergency pin P into a hole 3b formed through the bezel 3 since the hole 3b is aligned with the loading gear unit G1, thereby pushing the loading gear unit G1 away from the loading motor 21 to disengage the two. Afterwards, the emergency pin P is inserted into another hole 3c formed through the bezel 3 since the hole 3c is aligned with the rack gear unit G2, thereby pushing the rack gear unit G2 inward of the disk drive and away from the bezel 3 so as to eject the disk from the disk compartment.

Note that it requires two steps to remove the disk from the disk compartment. The procedure cannot be reversed or else the disk cannot be removed from the disk compartment.

SUMMARY OF THE INVENTION

The object of the present invention is to provide a disk drive, from which the disk can be removed manually and easily in case the disk drive is out of order or when no power source is available.

The disk drive of the present invention accordingly includes an insert-and-eject device and a disk guide unit. The insert-and-eject device is capable of inserting an optical disk into and ejecting the disk from the disk drive. The disk guide unit includes a rack and a slide member connected operably to the insert-and-eject device in such a manner that reciprocal movement of the disk guide unit along a first direction permits the slide member to drive the insert-and-eject device to insert and eject the optical disk from the disk drive. An emergency release device is mounted on the slide member, and includes a horizontal element movable along a second direction. The rack is formed with a retention groove such that the movement of the horizontal element along the second direction permits a part of the horizontal element extend within or exit the retention groove so as to couple the slide member to the rack or to disengage the slide member from the rack.

When the user inserts a disk-ejection rod into the disk drive so as to push the horizontal element away from the rack, thereby disengaging the horizontal element from the retention groove in the rack. Under this condition, further inward insertion of the disk-ejection rod results in movement of the slide member as well as the insert-and-eject device, thereby ejecting the disk outwardly from the disk compartment.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 1:
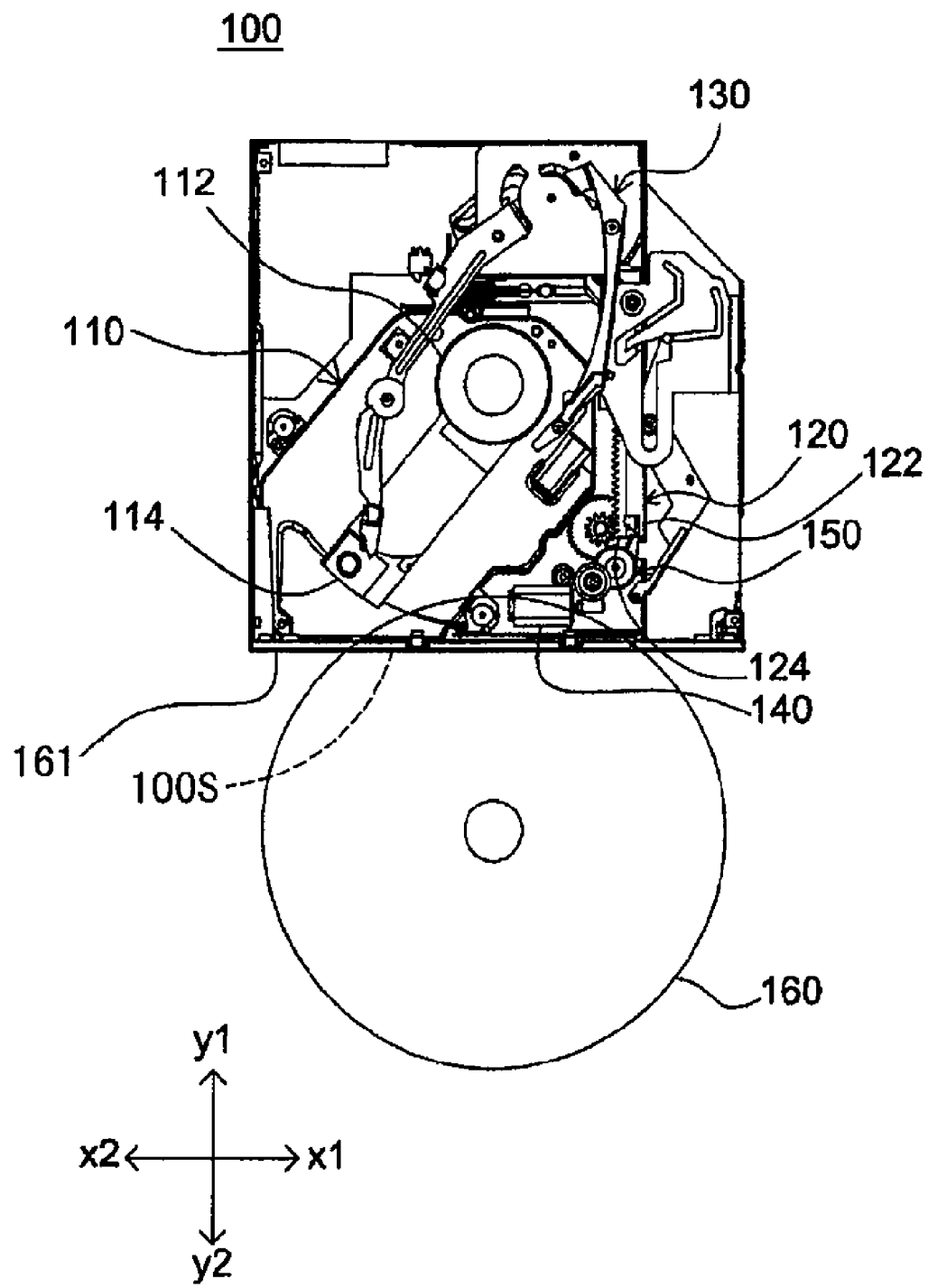
FIG. 1 is a slot-in type disk drive of the present invention, illustrating prior to insertion of an optical disk thereinto.

FIG. 1 illustrates one embodiment of the slot-in type optical disk drive 100 of the present invention prior to inserting an optical disk 160 into the disk compartment.

The disk drive 100 accordingly includes a reading module 110, a disk guide unit 120 and an insert-and-eject device 130, wherein the reading module further includes a spindle 112 and a read/write head 114 for respectively rotating the disk 160 and reading or writing data on the disk 160. The disk guide unit 120 is connected operably the reading module 110 and the insert-and-eject device 130 so as to be slidable reciprocally within the disk compartment along an inserting-and-ejection route (the first direction) defined by the disk 160 (i.e. along y1-y2 direction). The reciprocal movement of the disk guide unit 120 along the inserting-and-ejection route simultaneously drives the reading module 110 upward and downward relative to the disk 160, which, in turn, activates the insert-and-eject device 130, thereby drawing the disk 160 into or ejecting the disk 160 from the disk compartment.

The disk drive 100 of the present invention further includes a drive motor 140 and a gear set 150. The disk guide unit 120 further includes a slide member 122 and a rack 124, wherein gears of the gear set 150 are meshed with the drive motor 140 and the rack 124. The slide member 122 is connected operably to the reading module 110 and the insert-and-eject device 130 respectively in such a manner that sliding of the slide member 122 pushes the reading module 110 and the insert-and-eject device 130, thereby performing the corresponding tasks. Under the normal condition, the drive motor 140 activates and controls the slide member 122 and the rack 124 to slide simultaneously and reciprocally within the disk compartment. In other words, activation of the drive motor 140 will drive the gear set 150, thereby driving the disk guide unit 120 along the inserting-and-ejection route of the disk 160 (along the y1-y2 direction or first direction). In addition, the reciprocal sliding movement of the disk guide unit 120 along the y1 and y2 direction is controlled by rotation of the drive motor 140 in the clockwise or anti-clockwise direction via the gear set 150.

Figure 2:
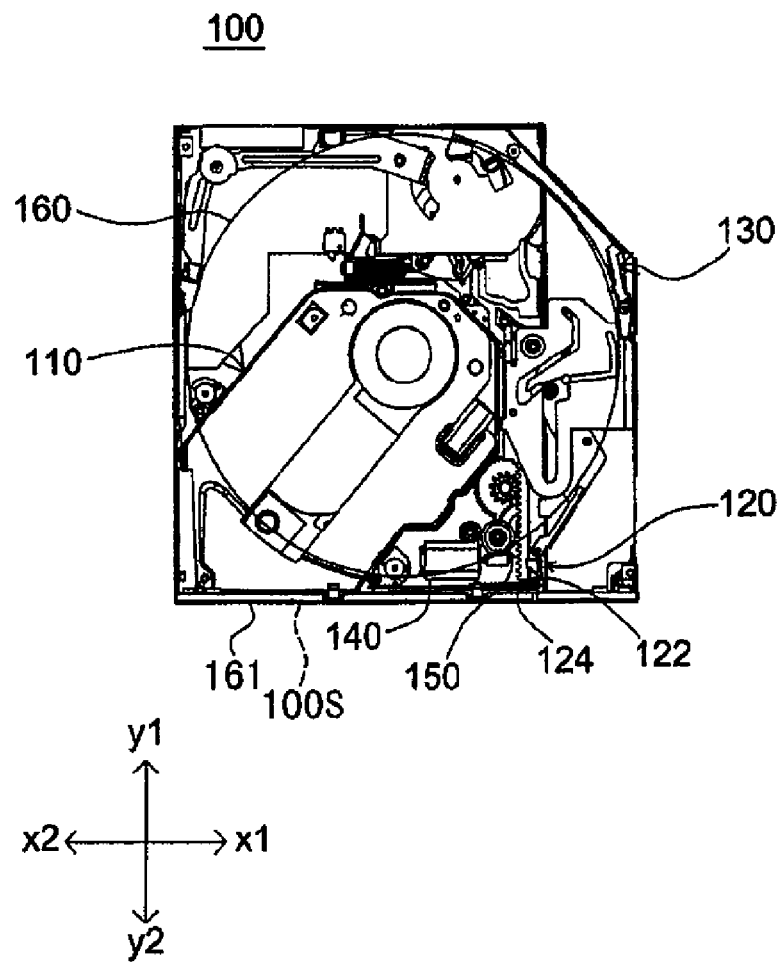
FIG. 2 shows the slot-in type disk drive of the present invention, illustrating the optical disk being inserted thereinto.

In this embodiment, prior to inserting the disk 160 into the disk compartment, the disk guide unit 120 is located inward and away from the entrance-and-exit slot 100S (see FIG. 1), which is formed through the front panel of the present disk drive 100 (i.e. adjacent to the y1 direction). When inserting the disk 160 into the disk compartment, the drive motor 140 is activated so is the gear set 150, which, in turn, results in simultaneously driving of the disk guide unit 120 and the insert-and-eject device 130 toward the entrance-and-exit slot 100S (along the y2 direction), thereby allowing the disk 160 to be inserted into the disk compartment. Referring to FIG. 2, once the disk 160 is received entirely within the disk compartment, the disk guide unit 120 is located adjacent to the entrance-and-exit slot 100S of the disk drive 100 (i.e. adjacent to the y2 direction).

In the similar manner, when it is desired to eject the disk 160 from the disk compartment, the drive motor 140 is activated and so is the gear set 150, which, in turn, results in simultaneously driving of the disk guide unit 120 and the insert-and-eject device 130 away from the entrance-and-exit slot 100S (along the y1 direction), thereby allowing the disk 160 to be ejected from the disk compartment. After ejecting the disk 160 from the disk compartment, the disk guide unit 120 will be located inward and away from the entrance-and-exit slot 100S (see FIG. 1), which is formed through the front portion of the present disk drive 100 (i.e. adjacent to the y1 direction).

Note that the structure of the insert-and-eject device 130 is not relevant feature of the present invention. For those skilled in the art, several structures can be implemented and a detailed description thereof is omitted herein for the sake of brevity.

Figure 3:
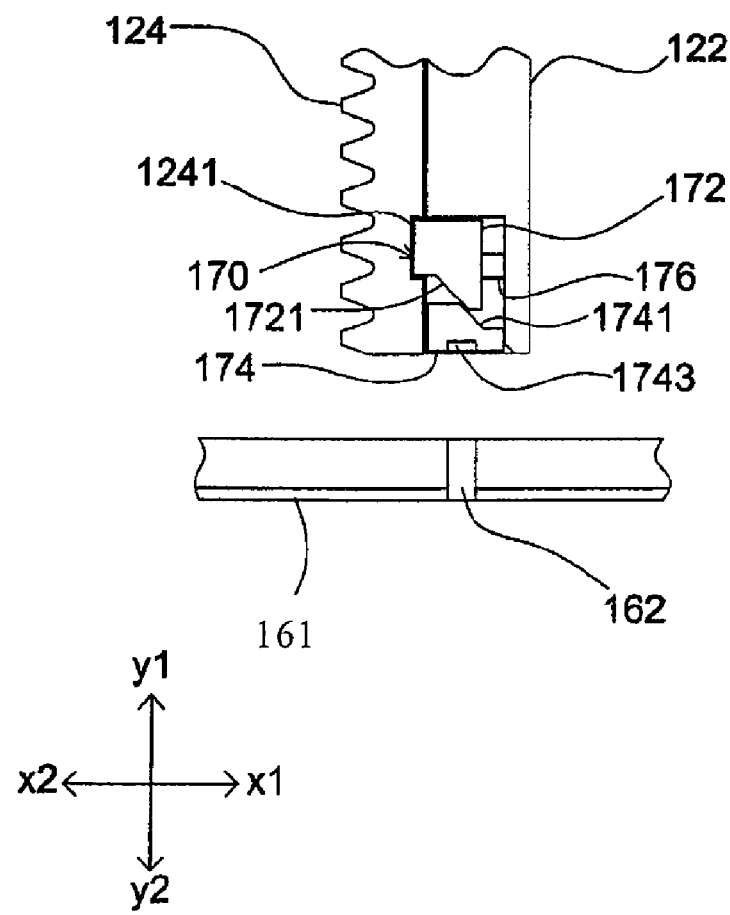
FIG. 3 shows an enlarged view of a portion of the disk drive of the present invention, illustrating an emergency release device implemented therein.

FIG. 3 shows an enlarged view of a portion of the disk drive 100 of the present invention, illustrating an emergency release device 170 implemented therein.

The disk drive 100 of the present invention further includes an emergency release device 170 mounted on the slide member 122 of the disk guide unit 120. The emergency release device 170 includes a horizontal element 172, a vertical element 174 and an elastic member 176. The horizontal element 172 is movable reciprocally on the slide member 122 along the x1-x2 direction (the second direction) while the vertical element 174 is movable reciprocally on the slide member 122 along the y1-y2 direction (the first direction). The elastic member 176 is interconnected between the slide member 122 and the horizontal element 172 for providing elastic force to urge the horizontal clement 172 toward the rack 124. In this embodiment, the horizontal element 172 is urged along the x2 direction. In addition, the horizontal element 172 has a first inclined face 1721 and the vertical element 174 has a second inclined face 1741 in slidable contact with the first inclined face 1721. Each of the first and second inclined faces 1721, 1741 possesses the same inclination degrees.

The disk drive of the present invention further includes a front panel 161 formed with an emergency hole 162. The vertical element 174 is formed with a positioning recess 1743 in alignment with the emergency hole 162 in the front panel 161 so as to position a disk-ejection rod within the positioning recess 1743 once inserted into the vertical element 174. In addition, the rack 124 is formed with a retention groove 1241 such that a part of the horizontal element 172 extends within the retention groove 1241 so as to couple the slide member 122 to the rack 124 due to the urging action of the elastic member 176 at the normal condition. As illustrated in FIGS. 1 and 2, the slide member 122 and the rack 124 simultaneously slide reciprocally along the insert-and-eject route (the first direction) of the disk 160.

Figure 4:
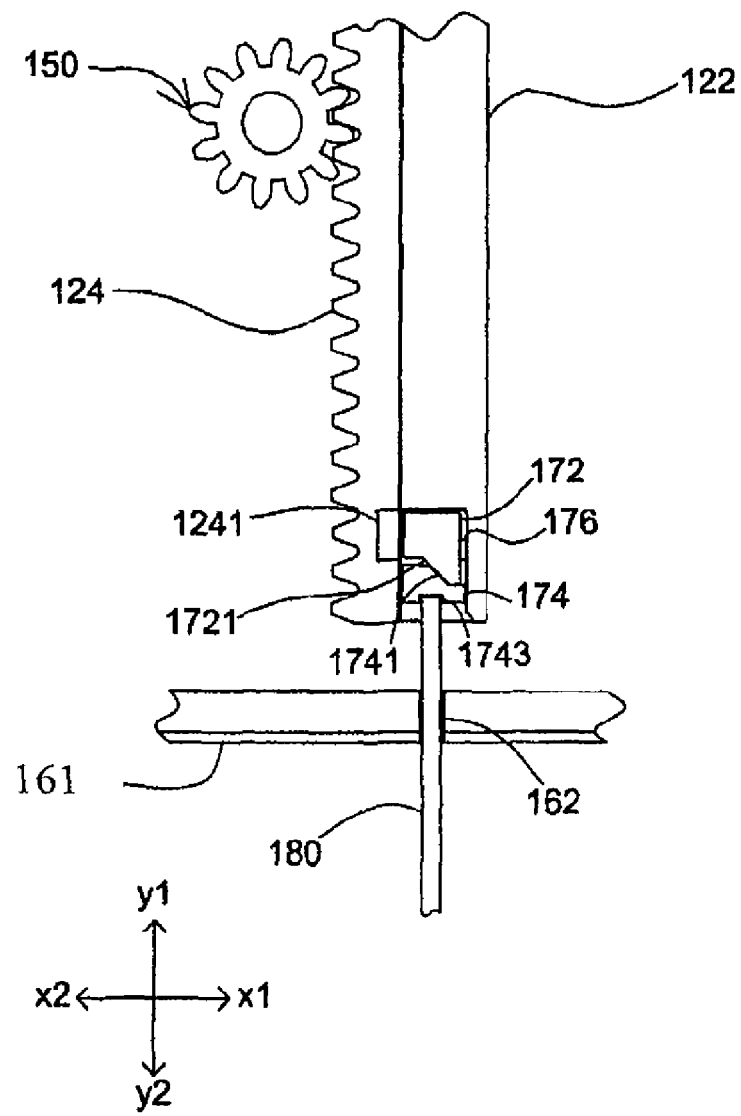
FIG. 4 shows the disk drive of the present invention, illustrating a disk-ejection rod being inserted thereinto.

FIG. 4 shows the disk drive of the present invention, illustrating a disk-ejection rod 180 being inserted into the emergency release device 170.

In case the disk drive of the present invention is out of order or when no electrical power is available, the gear set 150 cannot be rotated since it is meshed with the drive motor 140. Under this condition, the operator can insert the disk-ejection rod 180 (such as a pin) through the emergency hole 162 in the front panel 161 such that the inner end of disk-ejection rod 180 extend into the positioning recess 1743 of the vertical element 174. Upon pushing the disk-ejection rod 180 along the y1 direction, the vertical element 174 will slide simultaneously along the y1 direction. Because the first inclined face 1721 of the horizontal element 172 is in slidable contact with the second inclined face 1741 of the vertical element 174, the horizontal element 172 is limited to slide along the x1-x2 directions. Therefore the horizontal element 172 slides along the x1 direction and disengages from the rack 124, which, in turn, results in disengagement of the slide member 122 relative to the rack 124.

Figure 5:
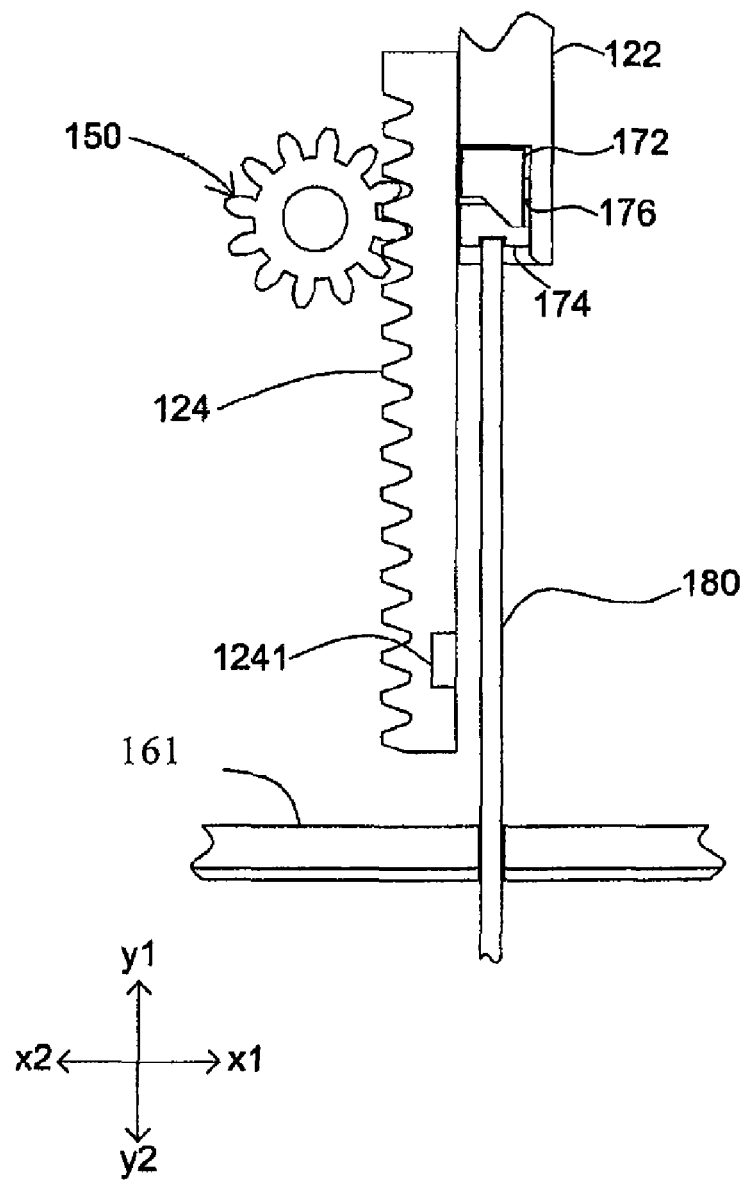
FIG. 5 shows the disk drive of the present invention, illustrating the disk-ejection rod being inserted further thereinto.

FIG. 5 shows the disk drive of the present invention, illustrating the disk-ejection rod 180 being inserted further into the emergency release device 170.

Once the horizontal element 172 slides along the x1 direction so as to disengage the slide member 122 from the rack 124, the slide member 122 can be pushed further inward by the disk-ejection rod 180 along the y1 direction. Inward movement of the slide member 122 can activate the insert-and-eject device 130 to eject the disk 160 from the disk compartment.

Referring to FIGS. 4 and 5, in case the disk drive 100 of the present invention is out of order or when no electrical power is available, the gear set 150 cannot be rotated since it is meshed with the drive motor 140. The rack 124 cannot slide either since it is meshed with the gear set 150. Therefore, only after releasing the engagement between the slide member 122 and the rack 124, the slide member 122 can be pushed by the disk-ejection rod 180 so as to slide along the y1 direction.

Figure 6:
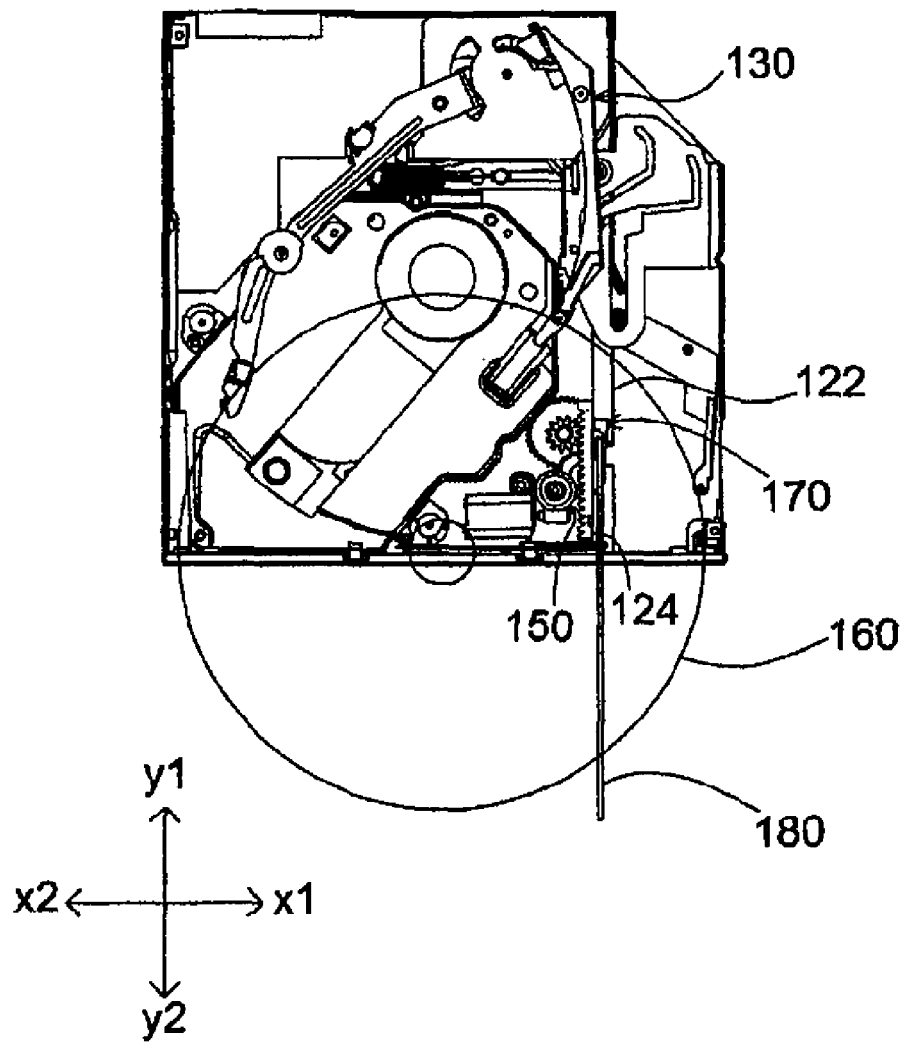
FIG. 6 shows the disk drive of the present invention releasing the disk therefrom due to insertion of the disk-ejection rod.

FIG. 6 shows the disk drive of the present invention releasing the disk 160 from the disk compartment due to the insertion of the disk-ejection rod 180, which drives the slide member 122 sliding along the y1 direction. Inward sliding of the slide member 122 activates the insert-and-eject device 130 to eject the disk 160 from the disk compartment. Note that the rack 124 meshed with the gear set 150 is located adjacent to the entrance-and-exit slot 100S (see FIG. 1) of the disk drive 100 (i.e. adjacent to the y2 direction).

The disk drive 100 of the present invention will be activated again upon retrieving of the power source so as to energize the drive motor 140. The gear set 150 is accordingly rotated so as to slide the rack 124 along the y1 direction. Upon reaching a position, in which, the retention groove 1241 of the rack 124 aligns with the horizontal element 172. The horizontal element 172 extends into the retention groove 1241 along the x2 direction by virtue of the elastic member 176, thereby coupling the slide member 122 and the rack 124 together. Then the slide member 122 and rack 124 are in the same condition prior to inserting the disk 160 into the disk compartment, as best shown in FIG. 1. At this time, the disk drive 100 can be operated normally, i.e. the drive motor 140 controls the rack 124 and the slide member 122 to slide simultaneously.

Once the horizontal element 172 extends into the retention groove 1241 of the rack 124 along the x2 direction due to the elastic force provide by the elastic member 176, the first and second inclined faces 1721, 1741 of the horizontal and vertical elements 172, 174 slidably contact each other. Under such a situation, the vertical element 174 is limited to slide only along the y1-y2 directions so that the vertical element 174 is pushed by the horizontal element 172 to slide along the y2 direction, thereby restoring the rack 124 and the slide member 122 to their initial position of FIG. 1.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A slot-in optical disk drive comprising:
    an insert-and-eject device for inserting an optical disk into and ejecting the optical disk from the disk drive;
    a disk guide unit including a rack and a slide member, wherein the slide member is connected to said insert-and-eject device in such a manner that reciprocal movement of said disk guide unit along a first direction permits said slide member to drive the insert-and-eject device to insert and eject the optical disk from the disk drive, wherein the first direction includes the insert direction and eject direction; and
    an emergency release device mounted on the slide member, and including a horizontal element movable along a second direction;
    wherein, said rack is formed with a retention groove such that the movement of said horizontal element along said second direction permits said horizontal element to extend within or exit said retention groove so as to couple said slide member to said rack or to disengage said slide member from said rack.

2. The disk drive according to claim 1, wherein said emergency release device further includes a vertical element movable along said first direction.

3. The disk drive according to claim 2, wherein said horizontal element has a first inclined face and said vertical element has a second inclined face in slidable contact with said first inclined face.

4. The disk drive according to claim 3, wherein each of said first and second inclined faces possesses the same inclination angle.

5. The disk drive according to claim 2, wherein said vertical element is formed with a positioning recess for positioning a disk-ejection rod.

6. The disk drive according to claim 5, further comprising a front panel formed with an emergency hole in alignment with said positioning recess in said vertical element so that said disk-ejection rod can be positioned within said positioning recess through the emergency hole.

7. The disk drive according to claim 1, wherein said first direction defines an inserting-and-ejection route for the optical disk, said first direction being perpendicular to said second direction.

8. The disk drive according to claim 2, wherein the movement of said vertical element along said first direction due to inward movement of a disk-ejection rod along said first direction simultaneously results in movement of said horizontal element along said second direction, thereby permitting said horizontal element to exit said retention groove and disengage said slide member from said rack.

9. The disk drive according to claim 1, wherein said emergency release device further includes an elastic member disposed between said slide member and said horizontal element for urging said horizontal element toward said rack.

* * * * *